US008322070B2

(12) United States Patent
Ueno et al.

(10) Patent No.: US 8,322,070 B2
(45) Date of Patent: Dec. 4, 2012

(54) METHOD FOR PRODUCING A MULCHING SHEET FOR AGRICULTURE

(75) Inventors: Hideto Ueno, Matsuyama (JP); Takanori Omori, Matsuyama (JP); Naohiro Fukuda, Matsuyama (JP); Fuminori Kanke, Yawatahama (JP)

(73) Assignees: Marusan Industrial Co., Ltd., Ehime (JP); Ehime Prefecture, Ehime (JP); Hideto Ueno, Ehime (JP)

( * ) Notice: Subject to any disclaimer, the term of this patent is extended or adjusted under 35 U.S.C. 154(b) by 0 days.

(21) Appl. No.: 12/877,342

(22) Filed: Sep. 8, 2010

(65) Prior Publication Data

US 2012/0055082 A1 Mar. 8, 2012

(51) Int. Cl.
*A01G 7/00* (2006.01)
(52) U.S. Cl. .................................................. 47/9
(58) Field of Classification Search .................... 47/9
See application file for complete search history.

(56) References Cited

U.S. PATENT DOCUMENTS

| | | | | |
|---|---|---|---|---|
| 2,008,142 A | * | 7/1935 | McClellan | 162/90 |
| 5,463,830 A | * | 11/1995 | Pien et al. | 47/9 |
| 7,788,847 B1 | * | 9/2010 | Holt et al. | 47/9 |
| 2005/0089640 A1 | * | 4/2005 | Tanaka | 427/356 |
| 2005/0217168 A1 | * | 10/2005 | Fujita | 47/9 |

FOREIGN PATENT DOCUMENTS

| JP | 06105602 A | * | 4/1994 |
|---|---|---|---|
| JP | 2005-198617 A | | 7/2005 |

* cited by examiner

*Primary Examiner* — Frank T Palo

(74) *Attorney, Agent, or Firm* — Brinks Hofer Gilson & Lione

(57) ABSTRACT

The present invention provides a method for producing a mulching sheet which easy to biodegrade and can be produced at a low cost. A cotton waste sheet is prepared with randomly accumulated cotton waste and impurities selected from a group consisting of cottonseeds, stems, leaves and calyxes of cotton tree. Water is sprayed to the cotton waste sheet. Thereafter, the cotton waste sheet is passed between a pair of calender rolls each taking a form of a Japanese drum, while being heated, to press the cotton waste sheet in the thickness direction. The cotton waste is thereby closed, and the obtained mulching sheet has a high tensile strength. Furthermore, the impurities in the cotton waste sheet are crushed or flatted. The mulching sheet is a mixture of parts made of flatted impurities and parts made of cotton waste.

10 Claims, 3 Drawing Sheets

METHOD FOR PRODUCING A MULCHING SHEET FOR AGRICULTURE

TECHNICAL FIELD

The present invention relates to the method for producing a mulching sheet which is spread on the ground to warm the ground or to prevent weeds from growing. Especially, the invention relates to the method for producing a mulching sheet which is biodegradable on the ground and therefore does not need to be removed from the ground.

BACKGROUND ART

As a mulching sheet for agriculture, nonwoven fabrics are used. For example, a nonwoven fabric consisting of polyethylene fine fibers which are obtained with a flash-spinning process is used. The nonwoven fabric is sold as Tyvek, which is a trade name. Tyvek has very fine pores. Therefore, Tyvek is superior in waterproofing and shading. If Tyvek is spread on the ground, weeds are prevented from growing. Furthermore, if Tyvek is spread on the ground, it protects fertilizer from being washed away from the ground and also protects a root of a fruit tree from being damaged. As a mulching sheet other than nonwoven fabric, black films consisting of synthetic resins such as polyethylene or polyvinylidene chloride are used. The black films are also superior in waterproofing and shading.

However, it causes a problem to dispose synthetic films or nonwoven fabrics consisting of synthetic fibers such as polyethylene fine fibers. It causes an environmental problem because synthetic films or nonwoven fabrics are incinerated. Especially, the problem is serious when the mulching sheets are largely used.

Therefore, nonwoven fabrics consisting of biodegradable fibers instead of the nonwoven fabrics consisting of synthetic fibers are used as the mulching sheets. For example, following Patent reference 1 discloses the use of cellulose fibers instead of the synthetic fibers. If nonwoven fabric consisting of cellulose fibers which are biodegradable is used as the mulching sheet, it will decompose and disappear during its use or after the use. Therefore, it prevents destruction of the environment.

Patent reference 1: JP2005-198617

Patent reference 1 discloses combining non-dewaxed cellulose fibers with dewaxed cellulose fibers because they have the ability to waterproof nonwoven fabric consisting of cellulose fibers. However, it is expensive to add the dewaxing process to produce the dewaxed cellulose fibers. Furthermore, cellulose fibers must be closely and extensively accumulated to bring out the effects of waterproofing and shading. However, by doing so, the nonwoven fabric becomes difficult to biodegrade.

SUMMARY OF THE INVENTION

The purpose of the present invention is to provide a method for producing a mulching sheet which is obtainable at a low price and easily biodegrades. For the purpose, the invention adopts cheap cotton waste instead of dewaxed cellulose fibers. Cotton waste is easily biodegradable even if it is extensively and closely accumulated.

The invention relates to a method for producing a mulching sheet for agriculture. The method comprises preparing a cotton waste sheet made of randomly accumulated cotton waste and including impurities selected from a group consisting of cottonseeds, stems of cotton tree, leaves of cotton tree and calyxes of cotton tree. The method further comprises spraying water to the cotton waste sheet and thereafter passing the cotton waste sheet between a pair of calender rolls each taking a form of a Japanese drum to heat and press the cotton waste sheet in the thickness direction, whereby squeezing the cotton waste sheet and crushing or flattening the impurities.

The cotton waste means fallen fluff during the process of spinning cotton fibers or picking up cotton fibers in raw cotton. The raw cotton includes impurities such as cottonseeds, stems of cotton tree, leaves of cotton tree and calyxes of cotton tree. The cotton waste can be incinerated as an industrial waste.

A mixture of the cotton waste and the impurities is prepared. The mixture is opened with a card machine, and the cotton waste and the impurities are randomly accumulated to prepare the cotton waste sheet. The cotton waste sheet is composed of the cotton waste which is randomly accumulated and the impurities which are present within the cotton waste. The cotton waste and the impurities can be used and need not be incinerated after the use. Furthermore, the cotton waste sheet may include other industrial wastes such as sludge, food residues and/or sawdust. It is preferable to use food residues, such as tofu residues, small pieces of sliced dried bonito and/or rice bran residues.

The weight of the cotton waste sheet is preferably about 50-200 g/m². If the weight of the cotton waste sheet is less than 50 g/m², the mulching sheet may lack the waterproofing and shading ability because the quantity of the cotton waste is small per a unit area and the cotton waste is not squeezed. If the weight of the cotton waste sheet is more than 200 g/m², it becomes difficult to carry the cotton waste sheet because of its weight and thus difficult to spread it on the ground with a conventional laying machine which is used to lay the previously mentioned black film because of the thickness of the cotton waste sheet. The thickness of the mulching sheet is preferably about 0.1-0.2 mm so that it can be laid on the ground with the conventional laying machine.

Water is sprayed on the cotton waste sheet. By spraying water and subjecting the cotton waste sheet to subsequent heating and pressing with a pair of calender rolls each taking a form of a Japanese drum, the cotton waste is strongly bound with a hydrogen bond. As one of ordinary skill would readily understand, the above described hydrogen bond is a result of the fact that cotton includes cellulose molecules which have hydroxyl groups (—OH). When the distance between hydroxyl groups is sufficiently small, a hydrogen bond is created between the hydroxyl groups. Furthermore, the small the distance between the hydroxyl groups the stronger the hydrogen bond formed becomes. Therefore, the obtained mulching sheet has a high tensile strength. It is preferable to interlace the cotton waste by needle-punching the cotton waste sheet before spraying water, during the spraying of water or after spraying water. If the cotton waste is interlaced, the cotton waste sheet becomes difficult to break while carrying it.

After spraying water, the cotton waste sheet is passed between a pair of calender rolls, each taking a form of a Japanese drum, and heated and pressed in the thickness direction. By heating and pressing the cotton waste sheet, the cotton waste is strongly bound. As a result, a mulching sheet can be obtained which has a high tensile strength. Furthermore, by heating and pressing the cotton waste sheet with the pair of calender rolls, each taking a form of a Japanese drum, the impurities are crushed and flattened. By crushing and flattening the impurities, it is possible to squeeze oil out of the impurities, such as cottonseed oil included in cottonseeds or oil included in stems, leaves and calyxes of cotton tree. Therefore, the mulching sheet becomes inclusive of oil. Such oil will make the ground rich.

The cotton waste sheet is passed between the pair of calender rolls for heating and pressing at a temperature of about 150-250° C. under a pressure of about 150-500 kg/cm. If the heating temperature is lower than 150° C., the mulching sheet may not have a high tensile strength, because it is difficult to bind the cotton waste with a hydrogen bond. Heating the cotton waste at a temperature higher than 250° C. is not reasonable and causes troubles. If the pressure is lower than 150 kg/cm, the mulching sheet may become non-biodegradable because it is difficult to crush or flatten the impurities. Pressing the cotton waste under a pressure higher than 500 kg/cm is not reasonable because of the use of such a high energy which causes short-living of the calender rolls. The Japanese drum takes a form in which the diameter of the roll is longest at the center of a roll in the axial direction and gradually becomes shorter towards both ends of the roll. Using the pair of the calender rolls, each taking a form of a japanese drum, it is possible to uniformly press cotton waste under a high pressure of about 150-500 kg/cm both at the center and the ends of the roll. Therefore, it is possible to uniformly press the cotton waste sheet in the cross direction.

After the heating and pressing processes, the mulching sheet of the present invention is obtained. Like the conventional mulching sheet, the mulching sheet of the present invention, when laid on the ground, warms the ground and prevents weeds from growing. The weight per area of the mulching sheet according to the present invention is about 50-200 g/m², as is the cotton waste sheet. The thickness of the mulching sheet according to the present invention is about 0.1-0.2 mm. Furthermore, the tensile strength of the mulching sheet according to the present invention is about 0.6-30 N per 2 centimeters across the cross section and in the machine direction.

DETAILED DESCRIPTION OF THE PREFERRED EMBODIMENTS

Figure 1:
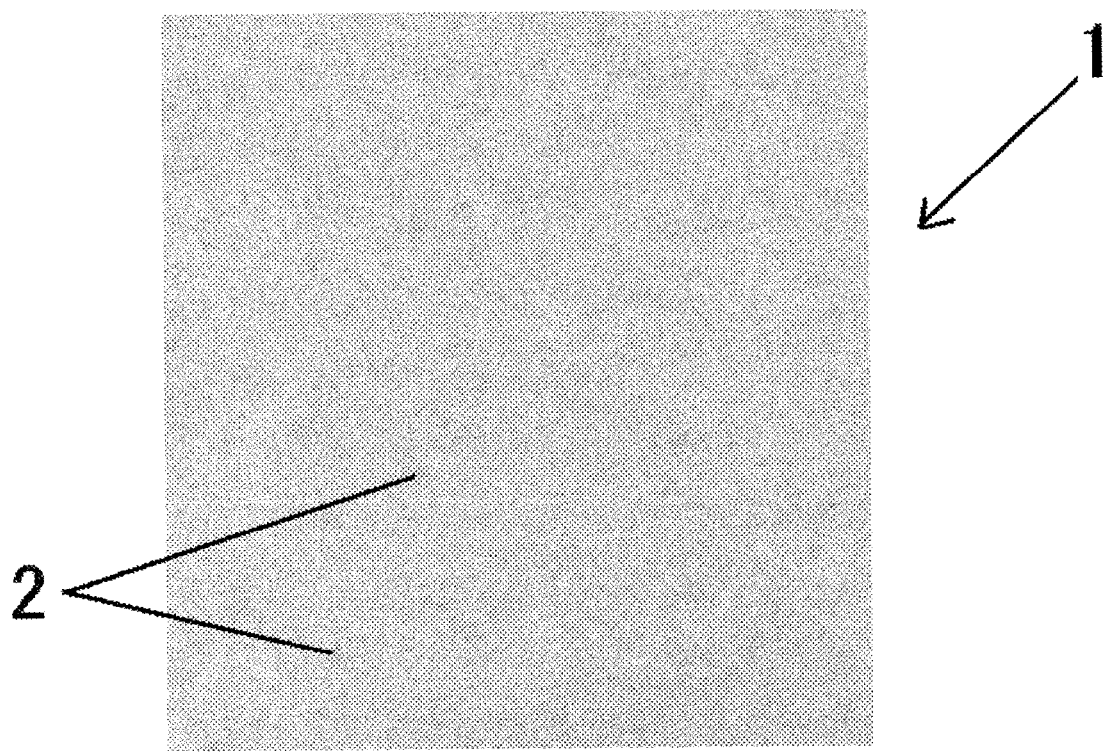
FIG. 1 is a photograph showing a plane view of an example of a cotton waste sheet which is used in the invention.
Figure 2:
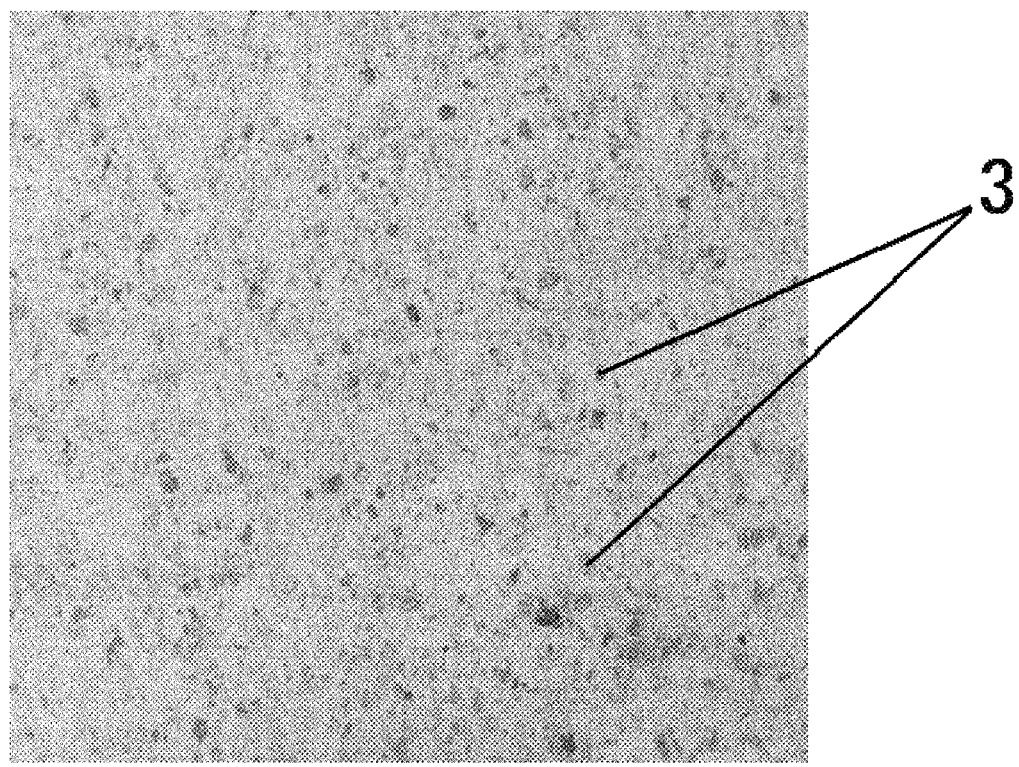
FIG. 2 is a photograph showing a plane view of a mulching sheet which is obtained by using the cotton waste of the FIG. 1.

FIG. 2 shows a photograph showing a plane view of one mulching sheet according to the present invention. Reference number 3 in FIG. 2 indicates flattened impurities such as cottonseeds. FIG. 1 shows a photograph showing a plane view of the cotton waste sheet the weight of which is about 80 g/m² to obtain the mulching sheet shown in FIG. 2. Reference number 2 indicates impurities such as cottonseeds before being flattened. The impurities 2 are very small as shown in FIG. 1, but the impurities 2 after being flattened become large as shown in FIG. 2. In FIG. 2, the impurities 2 occupy 5-50% of the area in the mulching sheet. It means that the cotton waste moves around the impurities 2.

Figure 3:
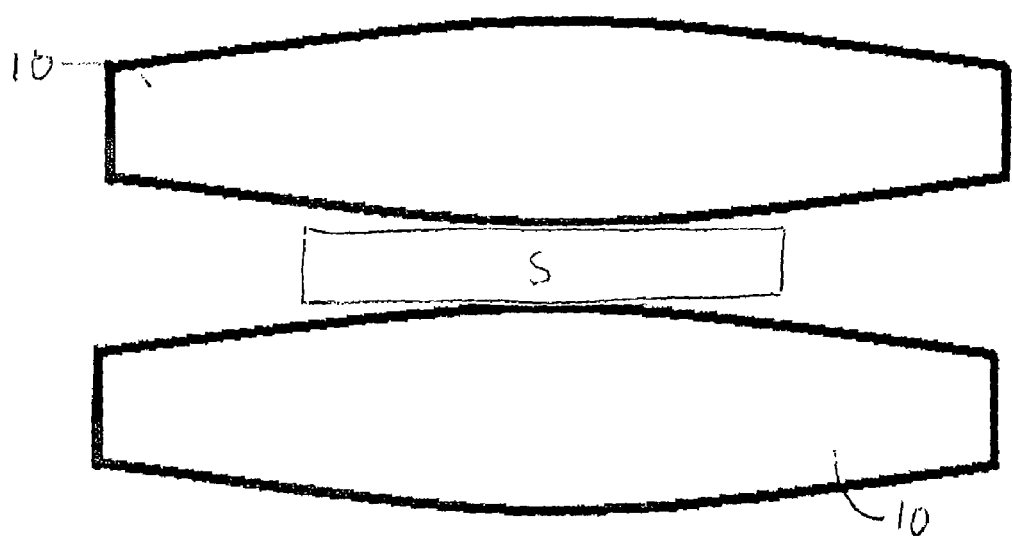
FIG. 3 schematically shows a front view an embodiment of a compression system that interacts with the cotton waste sheet of FIG. 1 in order to generate the mulching sheet of FIG. 2 in accordance with the present invention.

The impurities in the cotton waste sheet are crushed or flattened by using a compression system, such as the calendar rolls/Japanese drums previously described. The flattening process is schematically shown in FIG. 3, wherein a cotton waste sheet S is placed between two Japanese drums 10 that have been previously described. Note that the drums 10 are shown schematically in that they are being presented solely to demonstrate the general concept that the diameter of the drum becomes gradually shorter moving from the center to an end of the drum and are not to be deemed to denote a particular shape or dimensions for the drums. Once flattened by the drums 10, the sheet S occupies a wide area in the mulching sheet obtained according to the present invention. That is, the resulting mulching sheet is a mixture of parts made of flattened impurities and parts made of cotton waste. Therefore, the mulching sheet is easy to biodegrade because the flattened impurities fall from the mulching sheet as the cotton waste is biodegrading.

The mulching sheet includes oil which is squeezed from the flattened impurities. The mulching sheet supplies the oil to the ground and the ground thereby becomes rich. Furthermore, the impurities fertilize fruit trees and greens, because they are cottonseeds, stems, leaves and calyxes of cotton tree.

The mulching sheet according to the present invention consists of the cotton waste and the impurities which are also wastes. Therefore, the mulching sheet according to the present invention is produced at a low cost because it consists only of wastes. Furthermore, the mulching sheet according to the present invention, since made from wastes, is environmentally friendly.

The cotton waste sheet according to the present invention may include other industrial wastes such as sludge, food residues and sawdust, these industrial wastes function as an adhesive in the cotton waste. Therefore, the resulting mulching sheet has a high tensile strength.

What is claimed is:

1. A method for producing a mulching sheet for agriculture, the method comprising:
   preparing a cotton waste sheet with randomly accumulated cotton waste and impurities selected from a group consisting of seeds of cotton plants, stems of cotton plants, leaves of cotton plants and calyxes of cotton plants;
   spraying water to the prepared cotton waste sheet; and
   passing the water-sprayed cotton waste sheet between a pair of calender rolls, each taking a form of a Japanese drum, while heating the water-sprayed cotton waste sheet, to press the water-sprayed cotton waste sheet in a direction along the thickness of the water-sprayed cotton waste sheet, in order to squeeze the cotton waste sheet and crush or flatten the impurities.

2. The method for producing the mulching sheet for agriculture according to the claim 1, wherein the cotton waste sheet includes industrial wastes selected from a group consisting of sludge, food residues and sawdust.

3. The method for producing the mulching sheet for agriculture according to the claim 2, wherein the food residues are selected from a group consisting of tofu residues, small pieces of sliced dried bonito and rice bran residues.

4. The method for producing the mulching sheet for agriculture according to the claim 1, wherein pressing and heating the cotton waste sheet comprises heating the cotton waste sheet at a temperature of about 150-250° C. and pressing the cotton waste sheet under a pressure of about 150-500 kg/cm.

5. The method for producing the mulching sheet for agriculture according to the claim 1, wherein the cotton waste sheet is needle-punched before the heating and the pressing.

6. The mulching sheet for agriculture which is obtained by the method of the claim 1.

7. The mulching sheet for agriculture according to the claim 6, wherein the cotton plants are cotton trees.

8. The mulching sheet for agriculture according to the claim 6, wherein the pressing results in the creation of a hydrogen bond between hydroxyl groups present in the cotton waste sheet.

9. The method for producing the mulching sheet for agriculture according to the claim 1, wherein the cotton plants are cotton trees.

10. The method for producing the mulching sheet for agriculture according to the claim 1, wherein the pressing results in the creation of a hydrogen bond between hydroxyl groups present in the cotton waste sheet.

* * * * *